(12) United States Patent
Shibata et al.

(10) Patent No.: US 8,197,897 B2
(45) Date of Patent: Jun. 12, 2012

(54) METHOD OF MANUFACTURING PNEUMATIC TIRE

(75) Inventors: Hirokazu Shibata, Kanagawa (JP); Masamichi Danjo, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 47 days.

(21) Appl. No.: 12/991,457

(22) PCT Filed: May 15, 2009

(86) PCT No.: PCT/JP2009/059032
§ 371 (c)(1),
(2), (4) Date: Nov. 8, 2010

(87) PCT Pub. No.: WO2009/142148
PCT Pub. Date: Nov. 26, 2009

(65) Prior Publication Data
US 2011/0059237 A1    Mar. 10, 2011

(30) Foreign Application Priority Data

May 21, 2008    (JP) .................................. 2008-133675

(51) Int. Cl.
*B05D 1/12*    (2006.01)
*B05D 7/22*    (2006.01)
(52) U.S. Cl. .......................... 427/236; 427/195; 427/202
(58) Field of Classification Search .................. 427/236, 427/202, 195
See application file for complete search history.

(56) References Cited

U.S. PATENT DOCUMENTS

| 4,356,214 | A | * | 10/1982 | Soeda et al. .................. 427/233 |
| 5,472,746 | A | | 12/1995 | Miyajima et al. |
| 7,459,212 | B2 | | 12/2008 | Yamakawa et al. |
| 7,666,472 | B2 | * | 2/2010 | Hirose .......................... 427/236 |

FOREIGN PATENT DOCUMENTS

| JP | 4-212602 A | 8/1992 |
| JP | 5-318618 A | 12/1993 |
| JP | 6-255004 A | 9/1994 |
| JP | 7-081306 A | 3/1995 |
| JP | 8-025578 A | 1/1996 |
| JP | 2000-051776 | * 2/2000 |
| JP | 2001-198503 | * 7/2001 |
| WO | 2005-063482 A1 | 7/2005 |

* cited by examiner

*Primary Examiner* — Frederick Parker
(74) *Attorney, Agent, or Firm* — Carrier Blackman & Associates, P.C.; Joseph P. Carrier; William D. Blackman

(57) ABSTRACT

Provided is a method of manufacturing a pneumatic tire which enables an inner liner layer made of a thermoplastic resin or a thermoplastic elastomer composition to be formed without decreasing the productivity and deterioration the working environment. Powder 8 of a thermoplastic resin or a thermoplastic elastomer composition having an average particle diameter of not more than 1 mm is sprayed and adhered onto the inner surface of an uncured tire or a cured tire. Thereafter, the inner surface of the tire is heated under pressure so as to thermally fuse the powder 8 and bond the powder 8 to the inner surface of the tire, thereby forming an inner liner layer 7.

6 Claims, 1 Drawing Sheet

METHOD OF MANUFACTURING PNEUMATIC TIRE

TECHNICAL FIELD

The present invention relates to a method of manufacturing a pneumatic tire. Specifically, the present invention relates to a method of manufacturing a pneumatic tire, the method enabling a uniform and defect-free inner liner layer to be formed without involving a step of forming a film of a thermoplastic resin and the like in manufacturing of a pneumatic tire having an inner liner layer made of a thermoplastic resin or a thermoplastic elastomer composition.

BACKGROUND ART

A pneumatic tire has been put into practical use in which an inner liner layer is made of a thermoplastic resin or a thermoplastic elastomer composition, which is far superior in air impermeability to rubber, instead of a conventionally used butyl rubber composition.

However, in order to provide a thermoplastic resin or a thermoplastic elastomer composition as the inner liner layer, it is necessary to form these materials into the shape of a film in advance, and then mount the thus formed materials onto the inner surface of an uncured tire. Accordingly, a facility for forming a film is required, and, moreover, many labor-intensive steps for handling thin films are involved. Thus, there has been a problem of low productivity.

As part of countermeasures taken against this problem, proposals have been made on a method of forming an inner liner layer by spraying or applying a certain solution of a polymeric material or a certain emulsion onto a tire inner surface (refer to Patent Documents 1 and 2, for instance). However, these proposals entail a problem that the working environment is deteriorated by scattering of an organic solvent coming from the solution or emulsion applied. Accordingly, in order to prevent such deterioration of the working environment, it is necessary to install a facility for removing such scattered organic solvent and a new step associated therewith. Thus, there arises a problem of significantly decreased cost efficiency and productivity.

PRIOR ART DOCUMENT

Patent Document

Patent Document 1: Japanese patent application Kokai publication No. Hei. 5-318618
Patent Document 2: Japanese patent application Kokai publication No. Hei. 7-81306

SUMMARY OF THE INVENTION

Problem to be Solved by the Invention

The present invention aims at solving the foregoing problems. An object of the present invention is to provide a method of manufacturing a pneumatic tire, the method enabling an inner liner layer made of a thermoplastic resin or a thermoplastic elastomer composition to be formed without decreasing the productivity or deteriorating the working environment.

Means for Solving the Problem

A first invention of the method of manufacturing a pneumatic tire according to the present invention to achieve the above object is characterized by comprising the steps of: after building an uncured tire exclusive of an inner liner layer, spraying a powder onto an inner surface of the uncured tire, the powder being made of any one of a thermoplastic resin and a thermoplastic elastomer composition having an average particle diameter of not more than 1 mm; and subsequently curing the uncured tire so as to thermally fuse the powder and bond the powder to the inner surface of the uncured tire, thereby forming an inner liner layer.

Further, a second invention is characterized by comprising the steps of: after curing and molding a pneumatic tire exclusive of an inner liner layer, spraying a powder onto an inner surface of the cured pneumatic tire, the powder being made of any one of a thermoplastic resin and a thermoplastic elastomer composition having an average particle diameter of not more than 1 mm; and subsequently heating the inner surface of the pneumatic tire under pressure so as to thermally fuse the powder and bond the powder to the inner surface of the pneumatic tire, thereby forming an inner liner.

Further, it is preferable that the above-described configurations of the first invention and the second invention should be configured as described below.

(1) In the first invention, an adhesive is applied in advance to the inner surface of the uncured tire before the spraying of the powder. In the second invention, an adhesive is applied in advance to the inner surface of the pneumatic tire before the spraying of the powder.

(2) A tackifier is blended in advance into the powder before the spraying of the powder.

Effects of the Invention

According to the method of manufacturing a pneumatic tire of the present invention, in the first invention, a powder is sprayed onto an inner surface of an uncured tire, the powder being made of any one of a thermoplastic resin and a thermoplastic elastomer composition having an average particle diameter of not more than 1 mm, and subsequently the uncured tire is cured so as to thermally fuse the powder and bond the powder to the inner surface of the uncured tire, thereby forming an inner liner layer. Further, in the second invention, a powder is sprayed onto an inner surface of the cured pneumatic tire, the powder being made of any one of a thermoplastic resin and a thermoplastic elastomer composition having an average particle diameter of not more than 1 mm; and subsequently the inner surface of the pneumatic tire is heated under pressure so as to thermally fuse the powder and bond the powder to the inner surface of the pneumatic tire, thereby forming an inner liner. In the case of the present invention, as described above, the powder is made with a fine particle diameter. For this reason, the present invention enables the powder to adhere to the tire inner surface evenly, and, at the same time, enables the adhering powder to diffuse in the form of a film by thermal fusion, thereby thermally fuse the powder and bond the powder to the tire inner surface. Accordingly, it is possible to form a uniform and defect-free inner liner layer. In addition, in the forming of the inner liner layer, no film forming step to be performed in advance is involved, and no organic solvent is used. Accordingly, decrease in the productivity and deterioration of the working environment do not occur.

BEST MODES FOR CARRYING OUT THE INVENTION

Hereinbelow, detailed descriptions will be provided for a configuration according to the present invention by referring to the attached drawings.

Figure 1:
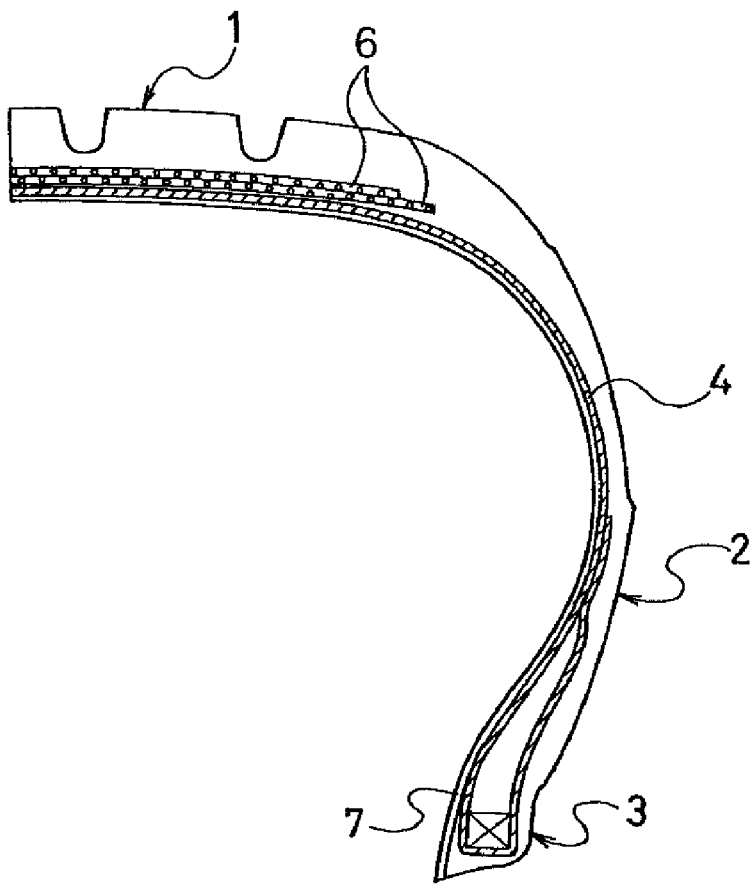
FIG. 1 is a half cross-sectional view showing an example of a pneumatic tire manufactured with a manufacturing method according to the present invention.

FIG. 1 is a half cross-sectional view showing an example of a pneumatic tire manufactured with a manufacturing method according to the present invention. In FIG. 1, reference numeral 1 denotes a tread part; 2, a sidewall part; and 3, a bead part. A carcass layer 4 is placed in the inside of the tire in such a way that the carcass layer 4 extends from the tread part 1 to the bead parts 3 through the respective sidewall parts 2 on the left and right, and has both end portions folded back at the respective bead parts 3. As an air-permeation preventing layer, an inner liner layer 7 is provided on the inner side of this carcass layer 4. Further, two belt layers 6 are provided on the outer circumferential side of the carcass layer 4 in the tread part 1.

The method of manufacturing a pneumatic tire according to the present invention is characterized by a method of forming the inner liner layer 7. The first invention is characterized in that: after an uncured tire exclusive of the inner liner layer 7 is built, powder 8 of a thermoplastic resin or a thermoplastic elastomer composition with an average particle diameter of not more than 1 mm, preferably 1 to 100 μm, is sprayed from a nozzle 10 of a sprayer 9 onto an inner surface of this uncured tire, as illustrated in FIG. 2; and subsequently, this uncured tire is cured inside of a mold as well in a regular curing method so as to thermally fuse the powder 8 and bond the powder 8 to the inner surface of the uncured tire, thereby forming the inner liner layer 7 from this thermally fused and bonded thermoplastic resin or thermoplastic elastomer composition.

As described above, the powder 8 of the thermoplastic resin or the thermoplastic elastomer composition which is sprayed onto the inner surface of the uncured tire is made with a fine particle diameter. This enables the powder 8 to adhere to the inner surface of the uncured tire evenly, and, at the same time, enables the adhering powder 8 to diffuse in the form of a film by thermal fusion, thereby thermally fusing the adhering powder 8 and bonding the adhering powder 8 to the tire inner surface. Accordingly, it is possible to form the inner liner layer 7, which is uniform and free from defect.

Furthermore, in the forming of the inner liner layer 7, no film forming step to be performed in advance is involved, and no organic solvent is used. For this reason, decrease in the productivity and deterioration of the working environment do not occur.

Figure 2:
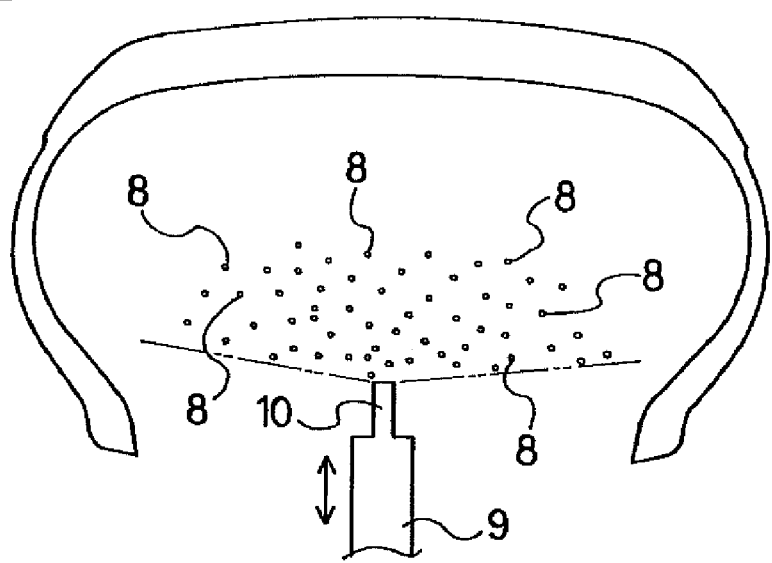
FIG. 2 is an explanatory diagram showing a step of spraying a powder to a tire inner surface according to an embodiment of the present invention.

Moreover, the second invention is characterized in that: after a pneumatic tire exclusive of the inner liner layer 7 is cured and molded, the powder 8 of a thermoplastic resin or a thermoplastic elastomer composition with an average particle diameter of not more than 1 mm, preferably 1 to 100 μm, is sprayed from the nozzle 10 of the sprayer 9 onto the inner surface of the cured pneumatic tire, as illustrated in FIG. 2; and subsequently, the inner surface of this pneumatic tire is heated under pressure so as to thermally fuse the powder 8 and bond the powder 8 to the inner surface of the cured tire, thereby forming the inner liner layer 7 from this thermally fused and bonded thermoplastic resin or thermoplastic elastomer composition.

As described above, the powder 8 of the thermoplastic resin or the thermoplastic elastomer composition which is sprayed onto the inner surface of the cured pneumatic tire is made with a fine particle diameter. This enables the powder 8 to adhere to the inner surface of the cured tire evenly, and, at the same time, enables the adhering powder 8 to diffuse in the form of a film by thermal fusion, thereby thermally fusing the adhering powder 8 and bonding the adhering powder 8 to the tire inner surface. Accordingly, it is possible to form the inner liner layer 7, which is uniform and free from defect.

In the above-described first and second inventions (hereinafter generically referred to as the present invention), when the average particle diameter of the powder 8 sprayed onto the tire inner surface exceeds 1 mm, the adhesion of the powder 8 to the tire inner surface becomes uneven, and the thermal fusion of the powder 8 becomes uneven, thereby causing defects, such as unevenness and a hole, in the inner liner layer 7. This results in the inner liner layer 7 incapable of playing its expected function. On the other hand, when the average particle diameter of the powder 8 is too small, the adhesion of the powder 8 to the inner surface of the tire is likely to be uneven. For this reason, it is desirable that the average particle diameter should be adjusted so that the lower limit of the average particle diameter can be approximately 1 to 2 μm.

Note that, in the case of the above-described second invention, no specific restriction is imposed on the means for heating the inner surface of the pneumatic tire under pressure. It is desirable that the heating should be carried out with a method of pressing a heated mold or bladder from the inner side. In such a case, with regard to the heating conditions, it is desirable that the temperature, pressure, and heating time should be set at 180° C., 2.5 MPa, and approximately 5 minutes, respectively.

The above-described average particle diameter of the powder 8 is defined as a volume-average particle diameter obtained through a laser diffraction/scattering particle diameter measurement.

In the case of the present invention, no specific restriction is imposed on the thermoplastic resin which constitutes the powder 8. Examples of the thermoplastic resin to be preferably used make the powder 8 includes: polyamide-based resins [for instance, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers]; their N-alkoxyalkylates, for instance, methoxymethylated nylon 6, methoxymethylated nylon 6/610 copolymers, and methoxymethylated nylon 612, polyester-based resins [for instance, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for instance, polyacrylonitirile (PAN), polymethacrylonitrile, acrylonitrile/styrene copolymers (AS), (meth)acrylonitrile/styrene copolymers, (meth)acrylonitrile/styrene/butadiene copolymers]; polymethacrylate-based resins [for instance, polymethyl methacrylate (PMMA), polyethylmethacrylate]; polyvinyl-based resins [for instance, polyvinyl acetate, polyvinyl alcohol (PVA), vinyl alcohol/ethylene copolymers (EVOH), polyvinylidene chloride (PDVC), polyvinyl chloride (PVC), vinyl chloride/vinylidene chloride copolymers, vinylidene chloride/methyl acrylate copolymers, vinylidene chloride/acrylonitrile copolymers (ETFE)]; cellulose-based resins [for instance, cellulose acetate, and cellulose acetate butyrate]; fluororesins [for instance, polyvinylidene fluoride (PVDF), polyvinyl fluoride (PVF), polychlorotrifluoroethylene (PCTFE), tetrafluoroethylene/ethylene copolymers]; imide-based resins [for instance, aromatic polyimide (PI)]; and the like.

In addition, the thermoplastic elastomer composition used for the present invention may be made by blending the above-mentioned thermoplastic resin with an elastomer.

Examples of the elastomer preferably used to make the thermoplastic elastomer composition include: diene rubbers and their hydrogenated products [for instance, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, hydrogenated SBR]; olefin-based rubbers [for instance, ethylene propylene rubbers (EPDM and EPM), maleic acid-modified ethylene propylene rubber (M-EPM), butyl rubber (IIR), copolymers of isoprene and aromatic vinyl or diene monomer, acrylic rubber (ACM), and ionomers]; halogen-containing rubbers [for instance, Br-IIR, Cl-IIR, brominated isobutylene para-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for instance, methyl vinyl silicone rubber, dimethyl silicone rubber, methylphenylvinyl silicone rubber]; sulfur-containing rubbers [for instance, polysulfide rubber]; fluororubbers [for instance, vinylidene fluoride-based rubbers, fluorine-containing vinyl ether-based rubbers, tetrafluoroethylene propylene-based rubbers, fluorine-containing silicone-based rubbers, fluorine-containing phosphazene-based rubbers]; thermoplastic elastomers [for instance, styrene-based elastomers, olefin-based elastomers, ester-based elastomers, urethane-based elastomers, and polyamide-based elastomers]; and the like.

If a specific one of the above-mentioned thermoplastic resins is incompatible with a specific one of the above-mentioned elastomers, an appropriate compatibilizer may be used as a third component to make the thermoplastic resin and the elastomer compatible with each other. The interfacial tension between the thermoplastic resin and the elastomer decreases when such a compatibilizer is mixed in the blend system of the thermoplastic resin and the elastomer. As a result, the size of rubber particles constituting the dispersion phase becomes finer. Accordingly, these two components exhibit their characteristics more effectively. In general, such a compatibilizer may have a copolymer structure including both or either of a structure of the thermoplastic resin and a structure of the elastomer, or a copolymer structure including an epoxy group, carbonyl group, a halogen group, an amino group, an oxazoline group, or a hydroxyl group, which is capable of reacting with the thermoplastic resin or the elastomer. Such a compatibilizer may be selected depending on the types of the thermoplastic resin and the elastomer with which the compatibilizer is mixed. Examples of the compatibilizer normally used include: styrene/ethylene-butylene block copolymers (SEBS) and their maleic acid-modified products; EPDM; EPM; EPDM/styrene or EPDM/acrylonitrile graft copolymers, and their maleic acid-modified products; styrene/maleic acid copolymers; reactive phenoxine; and the like. No specific restriction is imposed on the blending proportion of such a compatibilizer. It is desirable that the blending proportion of such a compatibilizer should be 0.5 to 10 parts by weight per 100 parts by weight of the polymer components (the total amount of the thermoplastic resin and the elastomer).

No specific restriction is imposed on the component ratio of the specific thermoplastic resin to the specific elastomer in the thermoplastic elastomer composition. This component ratio may be set as appropriate in order that the thermoplastic elastomer composition can have a structure in which the elastomer is dispersed as a discontinuous phase in the matrix of the thermoplastic resin. It is desirable that this component ratio should be in a range of 90/10 to 30/70 in weight ratio.

In the case of the present invention, the thermoplastic resin and the thermoplastic elastomer composition used to make the inner liner layer 7 may be mixed with other polymers, for instance, the above-mentioned compatibilizer and the like, as long as the other polymers do not impair the characteristics needed for the inner liner layer 7. The purposes of mixing such other polymers are to improve the compatibility between the thermoplastic resin and the elastomer, to improve the molding processability of the material, to improve the heat resistance, to reduce costs, and so on. Examples of materials used as such other polymers include polyethylene (PE), polypropylene (PP), polystyrene (PS), ABS, SBS, polycarbonate (PC), and the like. In addition, a filler (calcium carbonate, titanium oxide, alumina or the like) generally blended in the polymer blend, a reinforcing agent such as carbon black and white carbon, a softener, a plasticizer, a processing aid, a pigment, a dye, an antioxidant, and the like may be blended optionally as long as the blended materials do not impair the characteristics needed for the inner liner layer 7.

The thermoplastic elastomer composition thus obtained has a structure in which the elastomer component (B) is dispersed as a discontinuous phase in the matrix of the thermoplastic resin (A). Having such a structure, this thermoplastic elastomer composition can ensure both a sufficient flexibility and a sufficient rigidity based on the effect of the resin layer as the continuous phase. At the same time, when this thermoplastic elastomer composition is molded, the thermoplastic elastomer composition can ensure a molding processability equivalent to that of the thermoplastic resin, regardless of whether the elastomer component may be larger or smaller in amount.

From this point of view, it is preferable that the thermoplastic resin or the thermoplastic elastomer composition which constitutes the powder 8 used for the present invention should be adjusted so that its Young's modulus can be 10 to 100 MPa, or preferably 20 to 50 MPa when measured in accordance with JIS (Japanese Industrial Standard) K6215.

In order to allow the thermoplastic resin or the thermoplastic elastomer composition to have an excellent air-permeation preventing function as the inner liner layer 7, it is more preferable that the thermoplastic resin or the thermoplastic elastomer composition should be adjusted so that its permeability rating of air can be $(1.5 \text{ to } 3.0) \times 10^{-11}$ cc·cm/cm$^2$·sec·cmHg, preferably $(1.5 \text{ to } 2.0) \times 10^{-11}$ cc·cm/cm$^2$·sec·cmHg, the permeability rating being measured in accordance with JIS (Japanese Industrial Standard) K7126.

Furthermore, the elastomer may be dynamically vulcanized while mixed with the thermoplastic resin. A vulcanizing agent, a vulcanizing assistant, vulcanizing conditions (temperature, time), and the like, which are employed when the elastomer is dynamically vulcanized, may be determined depending on the composition of an elastomer to be added as necessary, and are not particularly restricted.

As the curing agent, any commonly-used rubber vulcanizing agent (crosslinker) may be used. Specifically, examples of the ionic vulcanizing agent include powdered sulfur, sedimentary sulfur, polymeric sulfur, surface-treated sulfur, insoluble sulfur, dimorpholine disulfide, alkylphenol disulfide, and the like. For instance, approximately 0.5 to 4 phr of such anionic vulcanizing agent may be used (In this description, "phr" denotes a part by weight per 100 parts by weight of elastomer component. Hereinbelow, the same applies).

Moreover, examples of the organic peroxide-based vulcanizing agent include benzoyl peroxide, t-butyl hydroperoxide, 2,4-dichlorobenzyl peroxide, 2,5-dimethyl-2,5-di(t-butyl peroxide) hexane, 2,5-dimethyl hexane-2,5-di (peroxylbenzoate), and the like. For instance, approximately 1 to 20 phr of such an organic peroxide-based vulcanizing agent may be used.

In addition, examples of the phenol resin-based vulcanizing agent include: a bromide of an alkylphenol resin; a mixed crosslinking system which contains an alkylphenol resin and a halogen donor, such as tin chloride and chloroprene; and the like. For instance, approximately 1 to 20 phr of such a phenol resin-based vulcanizing agent may be used.

Other examples include zinc flower (in the amount of approximately 5 phr), magnesium oxide (in the amount of approximately 4 phr), litharge (in the amount of approximately 10 to 20 phr), p-quinone dioxime, p-dibenzoyl quinone dioxime, tetrachloro-p-benzoquinone, poly-p-dinitrosobenzene (in the amount of approximately 2 to 10 phr) and methylenedianiline (in the amount of approximately 0.2 to 10 phr).

Furthermore, a vulcanizing accelerator may be added depending on the necessity. As such a vulcanization accelerator, general vulcanization accelerators, such as aldehyde ammonia-based, guanidine-based, thiazole-based, sulfenic amide-based, thiuram-based, dithioic acid salt-based, and thiourea-based vulcanization accelerators, may be used in an amount of, for instance, approximately 0.5 to 2 phr.

Specifically, examples of the aldehyde ammonia-based vulcanization accelerator include hexamethylene tetramine and the like. Examples of the guadinine-based vulcanization accelerator include diphenylguanidine and the like. Examples of the thiazole-based vulcanization accelerator include dibenzothiazyl disulfide (DM), 2-mercaptobenzothiazole and its Zn salts, cyclohexylamine salts, and the like. Examples of the sulfenic amide-based vulcanization accelerator include cyclohexylbenzothiazyl sulfenamide (CBS), N-oxydiethylenebenzothiazyl-2-sulfenamide, N-t-butyl-2-benzothiazole sulfenamide, 2-(thymol polynyl dithio) benzothiazole, and the like. Examples of the thiuram-based vulcanization accelerator include tetramethylthiuram disulfide (TMTD), tetraethylthiuram disulfide, tetramethylthiuram monosulfide (TMTM), dipentamethylenethiuram tetrasulfide, and the like. Examples of the dithioic acid salt-based vulcanization accelerator include Zn-dimethyl dithiocarbamate, Zn-diethyl dithiocarbamate, Zn-di-n-butyl dithiocarbamate, Zn-ethylphenyl dithiocarbamate, Te-diethyl dithiocarbamate, Cu-dimethyl dithiocarbamate, Fe-dimethyl dithiocarbamate, pipecoline pipecolyl dithiocarbamate, and the like. Examples of the thiourea-based vulcanization accelerator include ethylene thiourea, diethylthiourea, and the like.

As the vulcanization accelerator, any commonly-used rubber assistant may be used together. Examples of such a rubber assistant include zinc oxide (in the amount of approximately 5 phr), stearic acids and oleic acids and their Zn salts (in the amount of approximately 2 to 4 phr), and the like.

A method of producing the thermoplastic elastomer composition includes melt-kneading a thermoplastic resin and an elastomer (unvulcanized one in the case of a rubber) in advance by use of a biaxial kneader-extruder or the like, thereby dispersing the elastomer as a dispersed phase (domain) into the thermoplastic resin forming a continuous phase (matrix). In the case of vulcanizing the elastomer, a vulcanizing agent may added during the kneading, thereby dynamically vulcanizing the elastomer. In the meantime, various compounding agents (except for the vulcanizing agent) added to the thermoplastic resin or the elastomer component may be added during the kneading, but preferably added in advance before the kneading. No specific restriction is imposed on the kneading machine used to knead the thermoplastic resin and the elastomer. Examples of the kneading machine include a screw extruder, a kneader, a Banbury mixer, a biaxial kneader-extruder, and the like. It is preferable that, out of these machines, a biaxial kneader-extruder should be used to knead the thermoplastic resin and the elastomer as well as to dynamically vulcanize the elastomer. Furthermore, the kneading may be carried out by using two or more types of kneading machines one after another. With regard to conditions for the melt-kneading process, the temperature only needs to be equal to or higher than a temperature at which the thermoplastic resin melts. In addition, it is preferable that the shear rate should be 2500 to 7500 $sec^{-1}$ during the kneading process. It is preferable that the total time needed for the kneading should be 30 seconds to 10 minutes, and, in a case where the vulcanizing agent is added, the time needed for the vulcanizing after the adding should be 15 seconds to 5 minutes. A polymer composition, which has been produced with the above-described method, can be formed into any desired shape with a common method of forming a thermoplastic resin, such as injection molding and extrusion molding.

In the case of the present invention, it is desirable that an adhesive should be beforehand applied to the inner surface of the uncured tire or the cured pneumatic tire before the powder 8 is sprayed onto the tire inner surface. This further improves the adhesion of the powder 8 to the tire inner surface, thereby enabling the formation of the inner liner layer 7 which is more uniform and free from defect.

As the above-mentioned adhesive, any one of adhesives obtained by dissolving a polymer, such as an ordinary rubber-based polymer, a phenol resin-based polymer, an acrylic copolymer-based polymer, and an isocyanate-based polymer, and a crosslinking agent in a solvent is preferably used. These adhesives may be sprayed or applied to the inner surface of the uncured tire or the cured pneumatic tire. Examples of the solvent-based adhesives include a phenol resin-based adhesive (Chemlock 220 available from Rhode Co.), chlorinated rubber-based adhesives (Chemlock 205, Chemlock 234B), and an isocyanate-based adhesive (Chemlock 402).

It is more preferable that a tackifier should be beforehand blended in the powder 8 before the powder 8 is sprayed. This further ensures the adhesion of the powder 8 to the tire inner surface, thereby allowing the formation of the inner liner layer 7 which is more uniform and free from defect.

As the above-described tackifier, a tackifier, which is compatible with the rubber of the tire inner surface and the thermoplastic resin or the thermoplastic elastomer composition constituting and the powder 8, may be used, and examples of such a tackifier include: paraffin oil; sulphonamide; terpene resins; ester compounds, such as phosphoric acid esters and trimellitic acid esters; and liquid rubber.

As described above, the method of manufacturing a pneumatic tire according to the present invention is used to form the inner liner layer 7 by: spraying and adhering the powder 8, which is made of the thermoplastic resin or the thermoplastic elastomer composition with an average particle diameter of not more than 1 mm, to an inner surface of an uncured tire or a cured tire; and thereafter thermally fusing the powder 8 and bonding the powder 8 to the tire inner surface by heating the tire inner surface under pressure. Accordingly, the method involves no film forming step for forming the inner liner layer 7, and uses no organic solvent. For this reason, it is possible to form the inner liner layer 7 which is uniform and free from defect without decreasing the productivity and deteriorating the working environment. Thus, the method can be widely used as a method of manufacturing a tubeless tire.

EXAMPLES

[Adjustment of Powder of Thermoplastic Elastomer Composition]

As a material of the powder constituting the inner liner, a thermoplastic elastomer composition, whose blend was prepared as shown in Table 1, was kneaded by use of a biaxial kneader. Pellets (with a Young's modulus of 35 MPa, and an air permeability rating of $1.8 \times 10^{-11}$ cc·cm/cm$^2$·sec·cmHg) obtained from the thus-kneaded composition were grounded. Thereby, powder A with an average particle diameter of 100 μm and powder B with an average particle diameter of 2000 μm were produced.

TABLE 1

| | Part by weight |
|---|---|
| BIMS *1) | 100 |
| Zinc oxide | 0.5 |
| Stearic acid | 0.2 |
| Zinc stearate | 1.0 |
| N-6,66 *2) | 100 |
| Modified EEA *3) | 10 |
| Plasticizer *4) | 10 |

*1) available from ExxonMobil Chemical, Errpro 03035
*2) available from Ube Industries Ltd. UBE NYLON 5033B
*3) available from Du Pond-Mitsui Chemical Co., Ltd. HPR-AR201
*4) available from Daihachi Chemical Industry Co., Ltd.

[Evaluation of Tires]

Thirty tires were produced for each of the tires of the present invention (Examples 1 to 4) and for each of comparative tires (Comparative Examples 1 and 2), the thirty tires having a common tire size of 165SR13, a common tire structure as shown in FIG. 1, common manufacturing specifications except for a manufacturing specification for an inner liner layer. Note that the conditions for curing the tires of Examples 1 to 2 and Comparative Examples 1 to 2 were 185° C.×15 minutes and a pressure of 2.5 MPa while and the conditions for heating the inner surfaces of the tires of Examples 3 to 4 under pressure were 180° C.×15 minutes and a pressure of 2.5 MPa.

Example 1

An inner liner layer was formed on the inner surface of an uncured tire in accordance with the first invention. In this respect, a phenol resin-based adhesive (Chemlock 220) serving as the adhesive was applied in advance to the inner surface of the uncured tire. The powder A was adopted as the powder to be sprayed, and this powder A was sprayed onto the inner surface of the uncured tire by use of a commercially-available sprayer.

Example 2

An inner liner layer was formed on the inner surface of an uncured tire in accordance with the first invention. In this respect, a phenol resin-based adhesive (Chemlock 220) serving as the adhesive was applied in advance to the inner surface of the uncured tire. The powder A into which a tackifier (paraffin oil) had been beforehand blended was adopted as the powder to be sprayed, and this powder A was sprayed onto the inner surface of the uncured tire by use of a commercially-available sprayer.

Example 3

An inner liner layer was formed on the inner surface of a cured pneumatic tire in accordance with the second invention. In this respect, a phenol resin-based adhesive (Chemlock 220) serving as the adhesive was applied in advance to the inner surface of the cured pneumatic tire. The powder A was adopted as the powder to be sprayed, and this powder A was sprayed onto the inner surface of the cured pneumatic tire by use of a commercially-available sprayer. Note that the heating of the inner surface of the pneumatic tire under pressure was achieved by pressing a heated bladder against the tire inner surface.

Example 4

An inner liner layer was formed on the inner surface of a cured pneumatic tire in accordance with the second invention. In this respect, a phenol resin-based adhesive (Chemlock 220) serving as the adhesive was applied in advance to the inner surface of the cured pneumatic tire. The powder A into which a tackifier (paraffin oil) had been beforehand blended was adopted as the powder to be sprayed. This powder A was sprayed onto the inner surface of the uncured tire by use of a commercially-available sprayer. Note that the heating of the inner surface of the pneumatic tire under pressure was achieved by pressing the heated bladder against the tire inner surface.

Comparative Example 1

An inner liner layer was formed on the inner surface of an uncured tire with a method which was identical to the method according to the first invention. In this respect, a phenol resin-based adhesive (Chemlock 220) serving as the adhesive was applied in advance to the inner surface of the uncured tire. The powder B was adopted as the powder to be sprayed, and this powder B was sprayed onto the inner surface of the uncured tire by use of a commercially-available sprayer.

Comparative Example 2

The thermoplastic elastomer composition prepared as shown in Table 1 was molded into the form of a cylinder-shaped film. This cylinder-shaped film was inserted into a making drum as an inner liner layer. Thereafter, the tire constituent members were mounted onto the cylinder-shaped film. Thereby, an uncured tire was made.

In regard to these 6 types of tires, each tire was inspected with test methods to be described below, in terms of: the presence or absence of a defect in the inner liner layer on the inner tire surface; the presence or absence of separation between the inner liner layer and the tire inner surface rubber (hereinafter referred to as the presence or absence of inner liner layer/tire inner surface rubber separation); and the presence or absence of separation between the inner liner layer and the tire inner surface rubber in a tire having been subjected to durability running (hereinafter referred to as the presence or absence of inner liner layer/tire inner surface rubber separation after durability running). The result of the inspection is shown in Table 1 in a form with the number of tires in which a defect or separation was observed as a numerator and the total number of tires which were tested as a denominator.

[Presence or Absence of Defect in Inner Liner Layer on Tire Inner Surface]

The inner surface of each of the tires after the production was visually observed so as to investigate whether or not a defect, such as unevenness and a hole, occurred in the inner liner layer.

[Presence or Absence of Inner Liner Layer/Tire Inner Surface Rubber Separation]

Each of the tires after the production was investigated in terms of whether or not separation occurred between the inner liner layer and the tire inner surface rubber.

[Presence or Absence of Inner Liner Layer/Tire Inner Surface Rubber Separation after Durability Running]

Each of the tires after the production was mounted on a rim (whose size was 13×4.5 J), and inflated with an air pressure of 150 kPa. Thereafter, the resultant tire was subjected to running for 10,000 km by use of an indoor drum testing machine under conditions of an indoor temperature of 38° C., an applied load of 5.8 kN, and a speed of 80 km/h. The tire after the running was investigated in terms of whether or not separation between the inner liner layer and the tire inner surface rubber occurred.

TABLE 2

|  | Example | | | | Comparative Example | |
|---|---|---|---|---|---|---|
|  | 1 | 2 | 3 | 4 | 1 | 2 |
| Defect in inner liner layer on tire inner surface | 2/30 | 0/30 | 2/30 | 0/30 | 27/30 | 0/30 |
| Presence or absence of inner liner layer/tire inner surface rubber separation | 0/30 | 0/30 | 0/30 | 0/30 | 0/30 | 10/30 |
| Presence or absence of separation between inner liner layer/tire inner surface rubber after durability running | 0/30 | 0/30 | 0/30 | 0/30 | 3/30 | 3/30 |

As shown in Table 2, in the tires of the present invention, almost no defect was observed in the inner liner layer, and, moreover, no separation was observed between the inner liner layer and the tire inner surface rubber. Furthermore, in the tires of the present invention, no separation was observed between the inner liner layer and the tire inner surface rubber also after the durability running.

Incidentally, it was found that, in the case of the tires of Comparative Example 1, since the average particle size of the powder sprayed was too big, many defects, such as unevenness and uneven thickness, were observed in the inner liner surface of the tires after the production. It was found that, in the case of the tires of Comparative Example 2, since the sheet material was used as the inner liner layer, adhesion between the inner liner layer and the tire inner surface rubber in the tires after the production was insufficient, resulting in occurrence of separation therebetween.

Explanation of Reference Numerals

| 7 | inner liner layer |
| 8 | powder |

What is claimed is:

1. A method of manufacturing a pneumatic tire, comprising the steps of:
    after building an uncured tire exclusive of an inner liner layer, spraying a powder onto an inner surface of the uncured tire, the powder being made of any one of a thermoplastic resin and a thermoplastic elastomer composition having an average particle diameter of not more than 1 mm; and
    subsequently curing the uncured tire so as to thermally fuse the powder and bond the powder to the inner surface of the uncured tire, thereby forming an inner liner layer.

2. The method of manufacturing a pneumatic tire according to claim 1, wherein an adhesive is applied in advance to the inner surface of the uncured tire before the spraying of the powder.

3. The method of manufacturing a pneumatic tire according to claim 1, wherein a tackifier is blended in advance into the powder before the spraying of the powder.

4. A method of manufacturing a pneumatic tire, comprising the steps of:
    after curing and molding a pneumatic tire exclusive of an inner liner layer, spraying a powder onto an inner surface of the cured pneumatic tire, the powder being made of any one of a thermoplastic resin and a thermoplastic elastomer composition having an average particle diameter of not more than 1 mm; and
    subsequently heating the inner surface of the pneumatic tire under pressure so as to thermally fuse the powder and bond the powder to the inner surface of the pneumatic tire, thereby forming an inner liner.

5. The method of manufacturing a pneumatic tire according to claim 4, wherein an adhesive is applied in advance to the inner surface of the pneumatic tire before the spraying of the powder.

6. The method of manufacturing a pneumatic tire according to claim 4, wherein a tackifier is blended in advance into the powder before the spraying of the powder.

* * * * *